US012691696B2

(12) United States Patent
Hosoe

(10) Patent No.: US 12,691,696 B2
(45) Date of Patent: Jul. 28, 2026

(54) CONVEYING DEVICE

(71) Applicant: RISO KAGAKU CORPORATION, Tokyo (JP)

(72) Inventor: Yuki Hosoe, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 286 days.

(21) Appl. No.: 18/118,198

(22) Filed: Mar. 7, 2023

(65) Prior Publication Data

US 2023/0294427 A1 Sep. 21, 2023

(30) Foreign Application Priority Data

Mar. 17, 2022 (JP) ................................ 2022-042228
Feb. 20, 2023 (JP) ................................ 2023-024425

(51) Int. Cl.

*B41J 13/08* (2006.01)
*B41J 13/10* (2006.01)
*B41J 11/00* (2006.01)
*B41J 13/22* (2006.01)

(52) U.S. Cl.

CPC ............... *B41J 13/08* (2013.01); *B41J 13/10* (2013.01); *B41J 11/0085* (2013.01); *B41J 13/226* (2013.01)

(58) Field of Classification Search

CPC .................. B41J 2/16585; B41J 11/007; B41J 2002/1742; B41J 13/226; B65H 2406/32231; B65H 5/22
See application file for complete search history.

(56) References Cited

U.S. PATENT DOCUMENTS 6,336,722 B1 * 1/2002 Wotton ................ B41J 11/0024 347/105
8,303,104 B2 * 11/2012 Miyagi .................. B41J 11/007 347/101
8,911,052 B2 * 12/2014 Nishimura ............ B41J 13/226 347/16

(Continued)

FOREIGN PATENT DOCUMENTS

CN 1526567 9/2004
CN 112693931 4/2021

(Continued)

OTHER PUBLICATIONS

Apr. 11, 2025 Chinese Office Action in corresponding Chinese Application No. 202310221002.2 and machine translation thereof.

(Continued)

*Primary Examiner* — John P Zimmermann
(74) *Attorney, Agent, or Firm* — GREENBLUM & BERNSTEIN, P.L.C.

(57) ABSTRACT

A conveying device which is disposed so as to face an image forming unit that performs image formation on a medium and which conveys the medium while sucking the medium, the conveying device including: a conveying surface having a suction region that sucks the medium, wherein the suction region includes a first suction region including a region that faces an entirety of the image forming unit along a conveying direction of the medium, and a second suction region located on an upstream side of the first suction region in a conveying direction, the second suction region sucking the medium with a stronger sucking force than the first suction region.

5 Claims, 4 Drawing Sheets

(56) References Cited

U.S. PATENT DOCUMENTS

| | | | | |
|---|---|---|---|---|
| 9,283,779 | B2 * | 3/2016 | Hobo | B41J 11/0085 |
| 10,105,967 | B2 * | 10/2018 | Dekel | B41J 13/226 |
| 10,603,931 | B2 * | 3/2020 | De Roeck | B41J 13/0072 |
| 11,077,680 | B2 * | 8/2021 | Kanno | B41J 11/0025 |
| 2002/0109768 | A1 * | 8/2002 | Greive | B41J 11/007 347/104 |
| 2004/0239741 | A1 | 12/2004 | Ishii et al. | |
| 2010/0079531 | A1 * | 4/2010 | Kachi | B41J 11/0085 347/104 |
| 2010/0238250 | A1 * | 9/2010 | Kachi | B41J 11/0005 347/104 |
| 2015/0273879 | A1 * | 10/2015 | Soda | B41J 11/005 347/104 |
| 2020/0290373 | A1 * | 9/2020 | McLaughlin | B41J 11/0095 |

FOREIGN PATENT DOCUMENTS

| | | | |
|---|---|---|---|
| JP | 2003-211749 | | 7/2003 |
| JP | 2004-268417 | | 9/2004 |
| JP | 2007-76175 | A | 3/2007 |
| JP | 2009-280321 | A | 12/2009 |
| JP | 2010083035 | | 4/2010 |
| JP | 2016-132233 | | 7/2016 |
| WO | 2018/056245 | | 3/2018 |

OTHER PUBLICATIONS

Sep. 17, 2025 Chinese Office Action in corresponding Chinese Application No. 202310221002.2 and English translation thereof.

Feb. 2, 2026 Chinese Office Action in the corresponding Chinese Patent Application No. 202310221002.2 and English translation thereof.

* cited by examiner

CONVEYING DEVICE

CROSS-REFERENCE TO RELATED APPLICATION

This application is based upon and claims the benefit of priority of the prior Japanese Patent Application No. 2022-042228 filed on Mar. 17, 2022 and the prior Japanese Patent Application No. 2023-024425 filed on Feb. 20, 2023, the entire contents of which are incorporated herein by reference.

FIELD

The embodiments discussed herein are related to a conveying device that conveys a medium.

BACKGROUND

Conventionally, suction conveyance is known in which air is suctioned with a fan below an inkjet head of an image forming apparatus to generate a pressure, and a paper sheet is sucked onto a belt and conveyed. In this suction conveyance, a platen is provided under the belt, and a pressure chamber called a ribbed cell is provided on a side of a surface of the platen for sliding on the belt, to generate a negative pressure and achieve paper sheet sucking. Specifically, the negative pressure generated in the cell is applied to the paper sheet through a belt hole to suck the paper sheet onto a belt conveying surface.

In such suction conveyance, a method of generating a negative pressure in an entire region of a conveying surface and sucking a paper sheet is generally known (see, for example, Japanese Patent Laid-Open No. 2009-280321).

SUMMARY

In one aspect, a conveying device is disposed so as to face an image forming unit that performs image formation on a medium, and conveys the medium while sucking the medium, the conveying device including a conveying surface having a suction region that sucks the medium, the suction region including a first suction region including a region that faces an entirety of the image forming unit along a conveying direction of the medium, and a second suction region located on an upstream side of the first suction region in the conveying direction, the second suction region sucking the medium with a stronger sucking force than the first suction region.

The object and advantages of the present invention may be realized by the elements and their combinations described in the claims.

DESCRIPTION OF EMBODIMENTS

In suction conveyance, a negative pressure generation rate in a cell has a proportional relationship to a diameter of a cell hole connected to the cell, and the negative pressure generation rate in the cell increases when the cell hole diameter is large and decreases when the cell hole diameter is small. As long as the sucking of the conveyed paper sheet can be maintained, it is desirable to decrease the cell hole diameter as much as possible.

This is because, when the cell hole is enlarged, for example, flow of suction air due to suction is generated, and airflow on a belt conveying surface is disturbed. This might disturb a landing position of an ink mist droplet and degrade an image quality.

On the other hand, by decreasing the cell hole diameter, the negative pressure generation rate in the cell drops, and the negative pressure is hard to generate in a cell in an opened state where no paper sheet is put on a belt. Further, if there are many opening holes (cell holes in the opened state) carrying no paper sheet in the conveying surface in this manner, air flows from the opening holes, and the negative pressure of the cell in a sealed state with the paper sheet is hard to rise.

For these reasons, especially when the first paper sheet after start of image formation is to be forwarded to a platen, no paper sheet is on the belt, all holes are opened, and hence the negative pressure in all cells is hard to generate. In this state, when the paper sheet is conveyed onto the belt, a tip of the first paper sheet to be passed is not sufficiently sucked, and the paper sheet might float from the belt conveying surface. When the paper sheet floats from the belt conveying surface, head attack may occur in which the paper sheet comes in contact with an inkjet head. The occurrence of this head attack causes damages on the inkjet head and conveyance jam of paper sheets. In addition, there is concern that the head attack occurs not only in the paper sheet but also in another sheet-shaped medium.

Hereinafter, description will be made as to a conveying device (conveyor device) according to one embodiment of the present invention with reference to the drawings.

Figure 1:
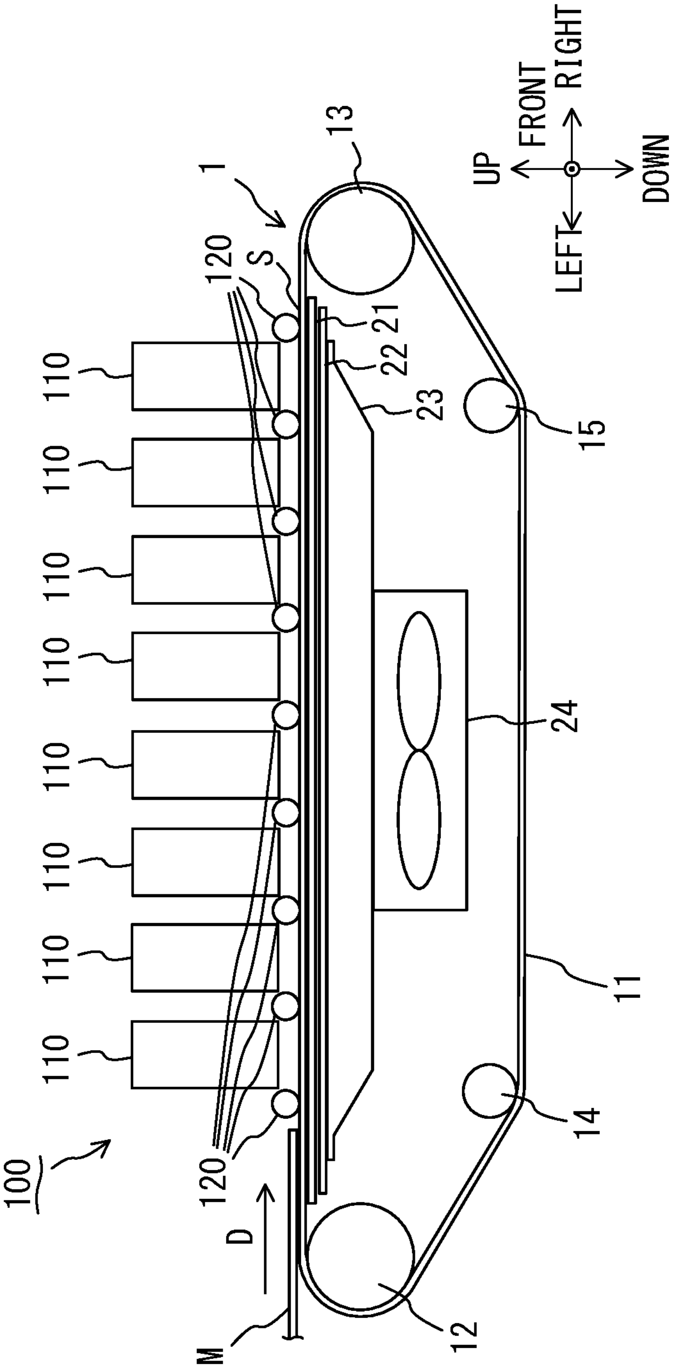
FIG. 1 is a front view showing an image forming apparatus including a conveying device according to one embodiment.

FIG. 1 is a front view showing an image forming apparatus 100 including a conveying device 1 according to the present embodiment.

Figure 2:
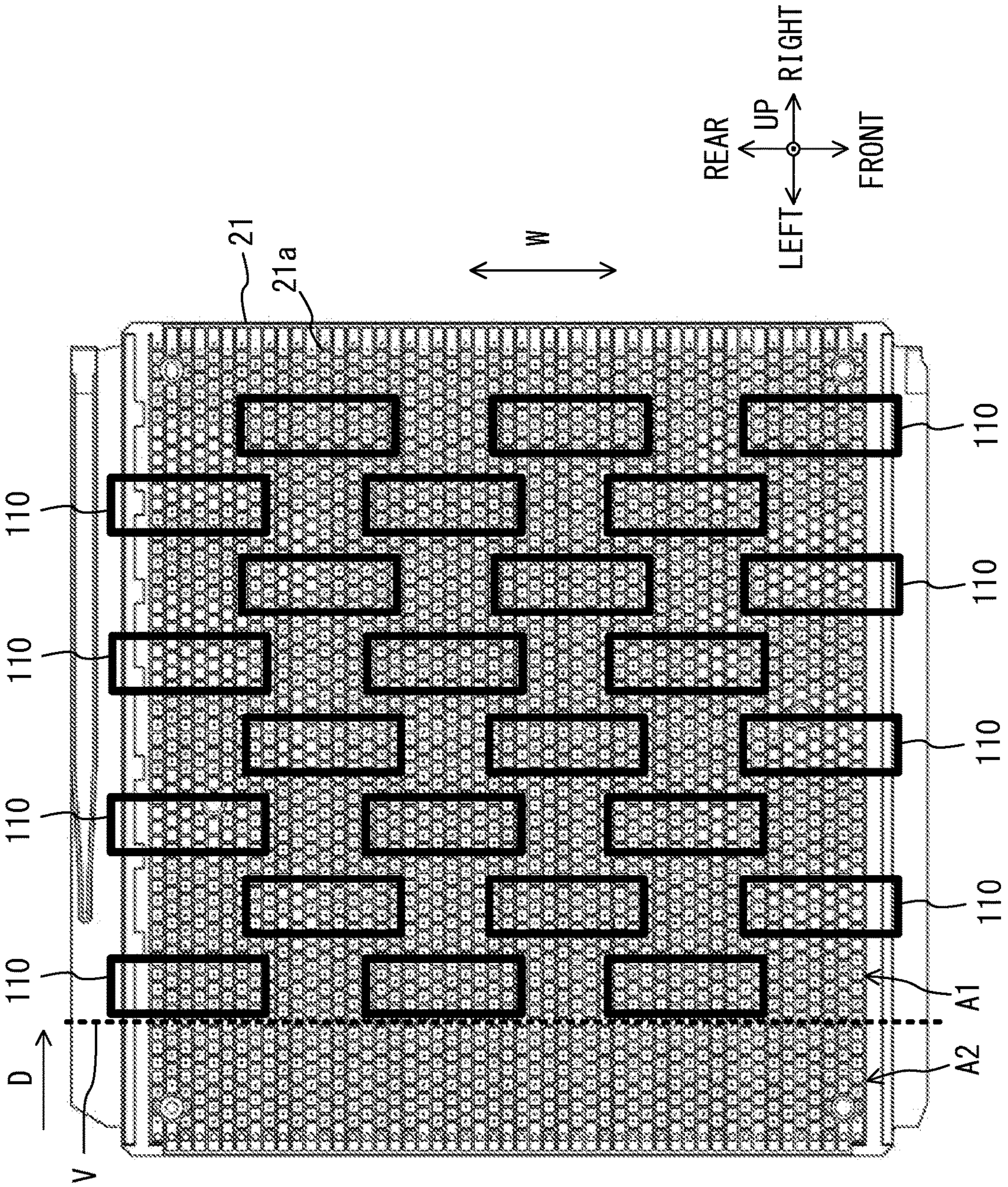
FIG. 2 is a plan view showing a platen for explaining a first suction region and a second suction region in one embodiment.
Figure 3:
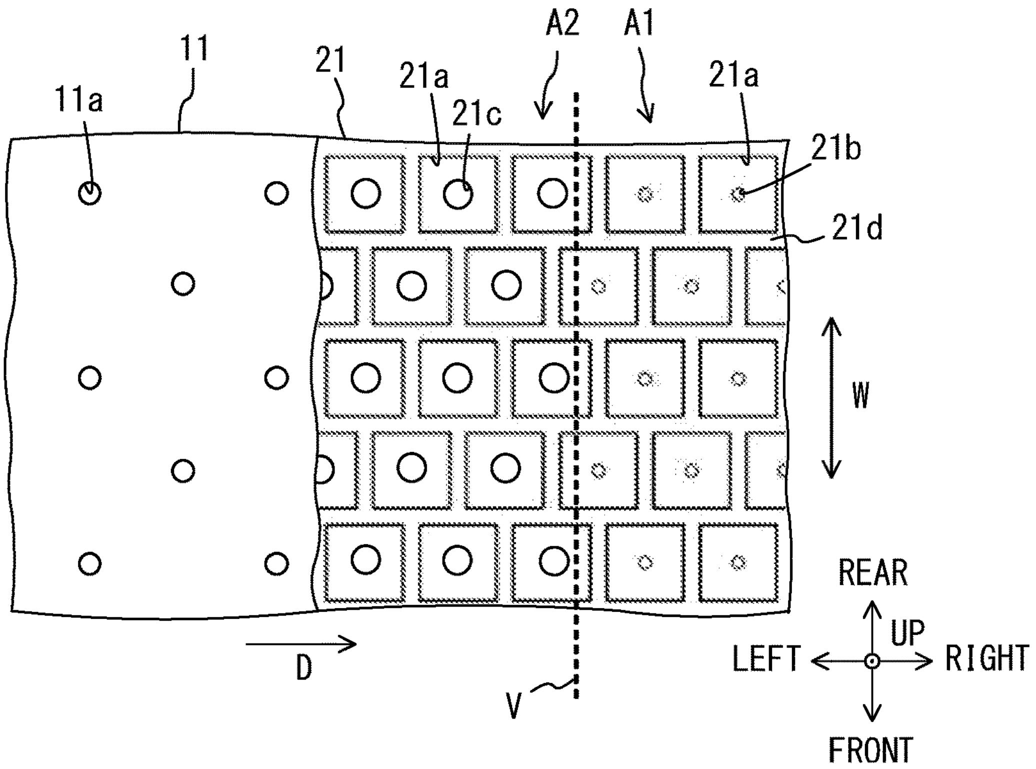
FIG. 3 is an enlarged plan view showing a part of a conveyor belt and the platen for explaining the first suction region and the second suction region in one embodiment.
Figure 4:
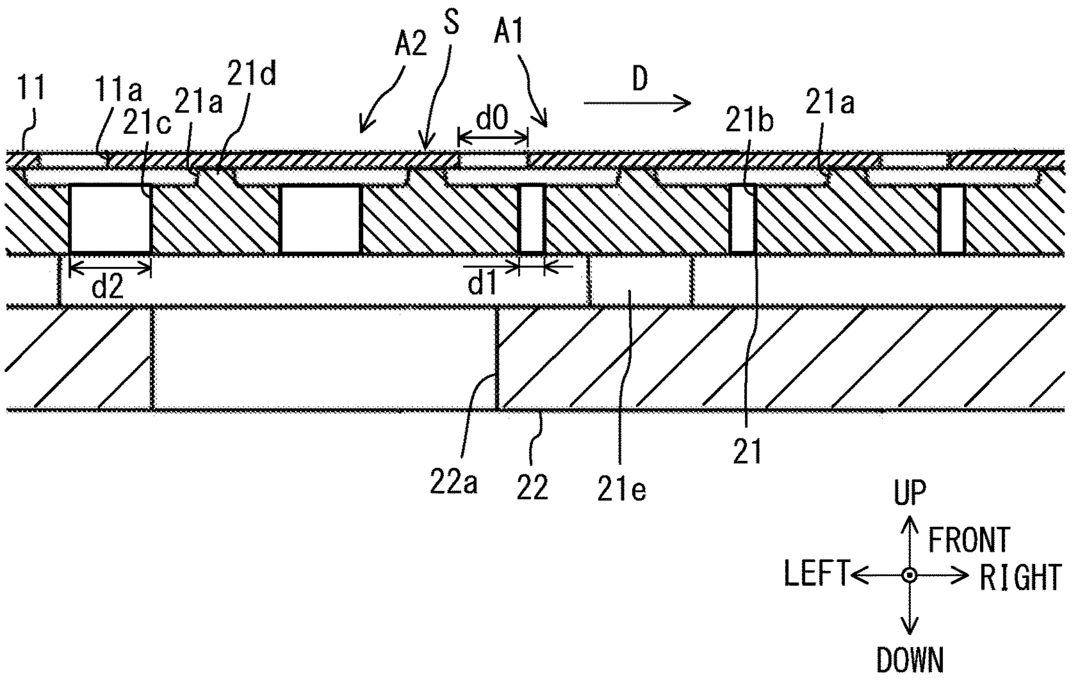
FIG. 4 is an enlarged cross-sectional view showing the platen and others for explaining the first suction region and the second suction region in one embodiment.

An up-down direction, left-right direction and front-rear direction shown in FIG. 1 and after-mentioned FIGS. 2 to 4 merely illustrate an example of a case where the right direction is a conveying direction D of a medium M. For example, the up-down direction indicates a vertical direction, and the left-right direction and front-rear direction indicate a horizontal direction. The medium M is, for example, a paper sheet. Alternatively, the medium M may be a sheet-shaped medium other than the paper sheet.

As shown in FIG. 1, the image forming apparatus 100 includes a plurality of inkjet heads 110 included in an example of an image forming unit (print head), a plurality of pressing rollers 120, and the conveying device 1.

The inkjet heads 110 perform image formation on the medium M by discharging ink. For example, as shown in FIG. 2, in each of eight rows of the inkjet heads 110 in the conveying direction D of the medium M, three inkjet heads are arranged in a width direction W of the medium M that is orthogonal to the conveying direction D, and hence 24 inkjet heads in total are arranged. The inkjet heads 110 in two rows adjacent to each other in the conveying direction D are arranged so as to deviate by half a pitch in the width direction W. Specifically, the inkjet heads 110 are arranged in a staggered manner.

Here, the image forming unit including the inkjet heads 110 as an example is not limited to a unit in which a plurality of rows of inkjet heads are arranged at intervals in the conveying direction D, one row (one unit) may only be disposed, and there are not any special restrictions on the number and arrangement of the rows. Further, the image forming unit is not limited to the inkjet head 110 and may include another image forming head such as a thermal head, a transfer body such as a photosensitive drum, or the like. FIG. 2 does not show a conveyor belt 11 described later, shows the plurality of inkjet heads 110 with thick solid lines, and shows a virtual line V representing a boundary in a downstream end portion of a second suction region A2 in the conveying direction D with a dashed line.

Each of the pressing rollers 120 is disposed at such a height that comes in contact with the conveyor belt 11 above the conveyor belt 11 so as to press the medium M conveyed by the conveyor belt 11 toward a conveying surface S of the conveyor belt 11. Thereby, the pressing rollers 120 follow rotation of the conveyor belt 11 to rotate.

For example, nine pressing rollers 120 are arranged in total, including seven pressing rollers each one between the respective rows of inkjet heads 110, one pressing roller on an upstream side of the inkjet head 110 on the most upstream side of the conveying direction D, and one pressing roller on a downstream side of the inkjet head 110 on the most downstream side of the conveying direction D. Two pressing rollers 120 may be provided between the respective rows of inkjet heads 110. The pressing roller 120 may be provided over the entire width direction W of the conveyor belt 11.

The conveying device 1 includes the conveyor belt 11, a plurality of pulleys 12 to 15, a platen 21, a platen plate 22, a chamber 23, and a fan 24.

The conveyor belt 11 is an endless band-shaped belt that rotates by being hung over the plurality of pulleys 12 to 15 and conveys the medium M while sucking the medium.

As shown in FIGS. 3 and 4, the conveyor belt 11 is provided with a plurality of belt holes 11*a*. For example, the belt holes 11*a* are arranged at the same interval as a formation interval of recesses 21*a* of the platen 21 described later in the width direction W, and at an interval corresponding to two formation intervals of the recesses 21*a* of the platen 21 described later in the conveying direction D, and the belt holes 11*a* in two rows adjacent to each other in the width direction W are arranged so as to deviate by half a pitch in the conveying direction D. Specifically, the belt holes 11*a* are arranged in a staggered manner. However, the arrangement of the belt holes 11*a* is not particularly limited.

The plurality of pulleys 12 to 15 include any one pulley (for example, the pulley 13) that is a drive pulley to which power is transmitted from drive means such as an unshown motor, and remaining pulleys that are driven pulleys.

The platen 21 is an example of a support member (support plate) that supports the conveyor belt 11 on a surface (lower surface) opposite to the conveying surface S (upper surface) of the conveyor belt 11. The platen 21 possesses, for example, a flat plate shape. On the platen 21, the conveyor belt 11 rotating as described above slides.

As shown in FIG. 2, the platen 21 has a plurality of recesses 21*a* (see FIGS. 3 and 4) arranged in each of the conveying direction D and the width direction W, the plurality of recesses being communicable with the belt holes 11*a*. Each recess 21*a* possesses, for example, a square shape in a planar view (seen from an inkjet head 110 side). The plurality of recesses 21*a* constitute a pressure chamber called a cell, and hence each recess 21*a* forms a suction region that sucks the medium M (a first suction region A1 and the second suction region A2), together with a first suction hole 21*b* and a second suction hole 21*c* described later that are connected to the recess 21*a*, in the conveying surface S of the conveyor belt 11.

Further, as shown in FIGS. 3 and 4, the platen 21 has first suction holes 21*b* connected to some recesses 21*a* among the plurality of recesses 21*a*, and second suction holes 21*c* connected to other recesses 21*a* among the plurality of recesses 21*a*. The first suction holes 21*b* define, on the conveying surface S, the first suction region A1 including a region that faces the entirety of the inkjet heads 110 along the conveying direction, by suctioning air from the recesses 21*a*. Further, the second suction holes 21*c* form, in the conveying surface S, the second suction region A2 located on an upstream side of the first suction region A1 in the conveying direction D, by suctioning air from the recesses 21*a*. These first suction holes 21*b* and second suction holes 21*c* penetrate the platen 21 in the up-down direction. Each of the first suction hole 21*b* and the second suction hole 21*c* may be provided in a diameter that is smaller than a width of the recess 21*a* in the front-rear direction and a width of the recess in the left-right direction and may be connected to a center of the recess 21*a* in a planar view.

The first suction holes 21*b* are respectively provided in the recesses 21*a* within an entire region on the downstream side from the virtual line V, in a plan view. An area including a region that faces the entirety of the inkjet heads 110 defines the first suction region A1.

The second suction hole 21*c* forms, in the conveying surface S, the second suction region A2 over an entire end portion of the platen 21 on the upstream side of the inkjet head 110 in the conveying direction D. Alternatively, the second suction region A2 may be a part of the conveying surface S on the upstream side of the inkjet head 110 (first suction region A1). The second suction region A2 is less than half the length of the first suction region A1 in the conveying direction D.

As shown in FIG. 4, a diameter d2 of the second suction hole 21*c* is larger than a diameter d1 of the first suction hole 21*b*, and hence a suction path that is a cross-sectional area of a suction route of the second suction hole 21*c* is wider than the suction path of the first suction hole 21*b*. Therefore, the second suction region A2 formed by the second suction hole 21*c* sucks the medium M with a stronger sucking force than the first suction region A1 formed by the first suction hole 21*b*.

In order to make the sucking force of the second suction region A2 stronger than the sucking force of the first suction region A1, a fan (example of a suction unit suction fan)) that suctions air from the second suction region A2 and a fan that suctions air from the first suction region A1 may be arranged separately, and a suction force of the fan that suctions air from the second suction region A2 may be made stronger than a suction force of the fan that suctions air from the first suction region A1. Alternatively, even if the first suction hole 21*b* and the second suction hole 21*c* have the same breadth of the suction path, the sucking force of the second suction region A2 may be made stronger than the sucking force of the first suction region A1, for example, by making an interval (density) at which the second suction hole 21*c* is provided smaller than an interval at which the first suction hole 21*b* is provided, by narrowing down a suction route between the fan 24 described later and the first suction hole 21*b* more than a suction route between the fan 24 and the second suction hole 21*c*, by making the recess 21*a* connected to the second suction hole 21*c* wider than the recess 21*a* connected to the first suction hole 21*b* to facilitate communication with the belt hole 11*a*, or the like. Further, when another sucking method such as electrostatic sucking is used instead of air suction, the sucking force of the second suction region A2 may be made stronger than the sucking force of the first suction region A1 by the other sucking method.

Further, the diameter d2 of the second suction hole 21*c* is larger than a diameter d0 of the belt hole 11*a*, and hence the suction path of the second suction hole 21*c* is wider than a suction path of the belt hole 11*a*. Thus, since the suction path of the second suction hole 21*c* is wider than the suction path of the belt hole 11*a*, a negative pressure is likely to be generated in the recess 21*a* of the second suction region A2. On the other hand, since the diameter d1 of the first suction hole 21*b* is smaller than the diameter d0 of the belt hole 11*a*, the suction path of the first suction hole 21*b* is narrower than the suction path of the belt hole 11*a*.

In a region where the recess 21*a* of the platen 21 is not formed, a rib 21*d* is provided to protrude upward. In other words, the recesses 21*a* are separated by the rib 21*d*.

The platen 21 is provided with a plurality of bosses 21*e* that protrude downward.

The platen plate 22 is disposed below the platen 21 and supports the platen 21 at lower ends of the plurality of bosses 21*e* of the platen 21. The platen plate 22 possesses, for example, a flat plate shape.

The platen plate 22 is provided with a plurality of through holes 22*a* communicating with a negative pressure chamber inside the chamber 23.

The chamber 23 is disposed below the platen plate 22 and has the negative pressure chamber inside.

The fan 24 exhausts from the negative pressure chamber of the chamber 23. Thereby, the fan 24 generates a negative pressure in the chamber 23, and this negative pressure generates the suction force in each through hole 22*a* of the platen plate 22, a gap between the platen plate 22 and the platen 21 (around the boss 21*e*), and the belt hole 11*a* through the recess 21*a*, the first suction hole 21*b* and the second suction hole 21*c* of the platen 21, to suck the medium M onto the conveyor belt 11. The fan 24 is an example of the suction unit (suction fan) that suctions air through a plurality of belt holes 11*a* so as to form the suction region (first suction region A1 and second suction region A2) in the conveying surface S.

When the electrostatic sucking or the like is used instead of the air suction to suck and convey the medium M, the fan 24 may not be provided. In the present embodiment, the conveying device 1 is disposed below the inkjet head 110, but the conveying device 1 may be disposed next to or above the inkjet head 110. In this case, a configuration different in orientation from the above-described configuration may be adopted.

In the present embodiment described above, the conveying device 1 is disposed so as to face the inkjet head 110 that is an example of the image forming unit that performs image formation on the medium M and conveys the medium M while sucking the medium. Further, the conveying device 1 includes the conveying surface S having the suction region that sucks the medium M. The suction region includes the first suction region A1 including a region that faces an entirety of the inkjet head 110 along the conveying direction of the medium M, and the second suction region A2 located on the upstream side of the first suction region A1 in the conveying direction D of the medium M, the second suction region sucking the medium M with a stronger sucking force than the first suction region A1.

Now, when a first medium M after start of the image formation rushes into the platen 21, no medium M is on the conveyor belt 11, all the belt holes 11*a* are opened, and the negative pressure is hard to generate in the recess 21*a* (cell). In this state, when the first medium M is conveyed onto the conveyor belt 11, a tip of the first medium M is not sufficiently sucked, and the first medium M easily floats from the conveying surface S. However, in the present embodiment, the second suction region A2 located on the upstream side of the first suction region A1 in the conveying direction D of the medium M sucks the medium M with the stronger sucking force than the first suction region A1. This can make it easier to suck the tip of the first medium M. Therefore, according to the present embodiment, possibility of contact of the sucked and conveyed medium M with the inkjet head 110 can be reduced. Furthermore, since the possibility of the contact of the medium M with the inkjet head 110 can be reduced, occurrences of damages on the inkjet head 110 and conveyance jam of the mediums M can be reduced. Further, when the inkjet head 110 is disposed as the image forming unit and suction sucking is used as the sucking method, in the first suction region A1, the medium M is already sucked onto the conveying surface S in the second suction region A2 located on the upstream side of the first suction region A1 in the conveying direction D of the medium M. Therefore, occurrence of degradation of an image quality due to disturbance of a landing position of an ink mist droplet discharged by the inkjet head 110 can be prevented, while the sucking of the medium M is maintained with a sucking force (suction force) weaker than in the second suction region A2. Furthermore, if, as in the case mentioned above, the second suction region A2 is less than half the length of the first suction region A1 in the conveying direction D, since a large portion of the suction region is the first suction region A1, which has a weaker suctional force than that of the second suction region A2, it is possible to further prevent degradation of image quality due to disturbance of the landing position of ink mist droplets, etc.

In the present embodiment, the conveying device 1 further includes the conveyor belt 11, the platen 21 as the example of the support member (support plate), and the fan 24 as the example of the suction unit (suction fan). The conveyor belt 11 has a plurality of belt holes 11*a*, and conveys the medium M in the conveying surface S. The platen 21 supports the conveyor belt 11 in the surface (lower surface) opposite to the conveying surface S (upper surface) of the conveyor belt 11. The fan 24 suctions air through the plurality of belt holes 11*a* so as to form the suction region in the conveying surface S. The platen 21 includes a plurality of recesses 21*a* arranged in each of the conveying direction D and the width direction W, the recesses being communicable with the belt holes 11*a*; a plurality of first suction holes 21*b* connected to some recesses 21*a* among the plurality of recesses 21*a*, the plurality of first suction holes forming the first suction region A1 by suctioning air from the recesses 21*a*; and a plurality of second suction holes 21*c* connected to other recesses 21*a* among the plurality of recesses 21*a*, and having a wider suction path than the plurality of first suction holes 21*b*, the plurality of second suction holes forming the second suction region A2 by suctioning air from the recesses 21*a*.

Thereby, the first suction region A1 and the second suction region A2 can be formed with a simple configuration in which the breadths of the suction paths of the first suction hole 21*b* and the second suction hole 21*c* that are connected to the recesses 21*a* of the platen 21 are changed. Therefore, with a simple configuration, the possibility of the contact of the sucked and conveyed medium M with the inkjet head 110 can be reduced.

In the present embodiment, the plurality of first suction holes 21*b* have a narrower suction path than the belt holes 11*a*, and the plurality of second suction holes 21*c* have a wider suction path than the belt holes 11*a*.

Thereby, in the second suction region A2 having a stronger sucking force (suction force) than the first suction region A1, the second suction hole 21*c* having a wider suction path than the belt hole 11*a* can make it easier to generate the negative pressure in the recess 21*a*. Therefore, when the first medium M after the start of the image formation rushes into the platen 21, no medium M is on the conveyor belt 11, all the belt holes 11*a* are opened, and the negative pressure is hard to generate in the recess 21*a* (cell), and even in this state, the tip of the first medium M can be more securely sucked. Also, when the inkjet head 110 is disposed as the image forming unit and the suction sucking is used as the sucking method, in the first suction region A1, the medium M is already sucked onto the conveying surface S in the second suction region A2. Therefore, the occurrence of the degradation of the image quality due to the disturbance of the landing position of the ink mist droplet discharged by the inkjet head 110 or the like can be more securely prevented, while the sucking of the medium M is maintained with the sufficiently weaker sucking force (suction force) than in the second suction region A2 by the first suction hole 21*b* having the narrower suction path than the belt hole 11*a*.

The present invention is not limited to the above-described embodiment as it is and can be embodied by modifying components without departing from the gist of the invention in an implementation stage. Further, various inventions can be formed by a suitable combination of a plurality of components disclosed in the above-described embodiment. For example, all components illustrated in the embodiment may be suitably combined. Needless to say, various modifications and applications are possible without departing from the gist of the invention.

In one aspect, a conveying device which is disposed so as to face an image forming unit that performs image formation on a medium and which conveys the medium while sucking the medium, the conveying device including:

- a conveying surface having a suction region that sucks the medium, wherein the suction region includes a first suction region including a region that faces an entirety of the image forming unit along a conveying direction of the medium, and a second suction region located on an upstream side of the first suction region in a conveying direction, the second suction region sucking the medium with a stronger sucking force than the first suction region.

In one other aspect, the conveying device further including:

- a conveyor belt having a plurality of belt holes, the conveyor belt conveying the medium in the conveying surface, and
- a support member supporting the conveyor belt in a surface opposite to the conveying surface of the conveyor belt, and
- a suction fan that suctions air through the plurality of belt holes so as to form the suction region in the conveying surface, wherein the support member includes a plurality of recesses arranged in each of the conveying direction and a width direction of the medium that is orthogonal to the conveying direction, the plurality of recesses being communicable with the belt holes; a plurality of first suction holes connected to some recesses among the plurality of recesses, the plurality of first suction holes forming the first suction region by suctioning air from the recesses; and a plurality of second suction holes connected to other recesses among the plurality of recesses, and having a wider suction path than the plurality of first suction holes, the plurality of second suction holes forming the second suction region by suctioning air from the recesses.

In one other aspect, the plurality of first suction holes have a narrower suction path than the belt holes, and

- the plurality of second suction holes have a wider suction path than the belt holes.

In another aspect, the second suction region is less than half the length of the first suction region in the conveying direction D.

What is claimed is:

1. A conveying device which is disposed so as to face an image forming unit that performs image formation on a medium and which conveys the medium in a conveying direction while applying a suction force to the medium, the conveying device comprising:

- a conveying surface having a suction region configured to apply the suction force to the medium, wherein the suction region includes
  - a first suction region including a region that faces an entirety of the image forming unit along the conveying direction, and
  - a second suction region located upstream of the first suction region in the conveying direction, the second suction region being configured to apply a stronger suction force to the medium than the first suction region;
- a conveyor belt including the conveying surface and configured to convey the medium and having a plurality of belt holes in the conveying surface;
- a support member supporting the conveyor belt on a surface thereof opposite to the conveying surface of the conveyor belt; and
- a suction fan configured to suction air through the plurality of belt holes so as to form the suction region in the conveying surface, wherein
- the support member includes
  - a plurality of recesses arranged in each of the conveying direction and a width direction of the medium that is orthogonal to the conveying direction, the plurality of recesses being positioned to communicate with the belt holes,
  - a plurality of first suction holes connected to a first subset of the plurality of recesses, the plurality of first suction holes forming the first suction region by suctioning air from the first subset of the plurality of recesses, and
  - a plurality of second suction holes connected to a second subset of the plurality of recesses different from the first subset of the plurality of recesses, each second suction hole having a diameter larger than the diameter of each first suction hole, the plurality of second suction holes forming the second suction region by suctioning air from the second subset of the plurality of recesses.

2. The conveying device according to claim 1, wherein

- the diameter of the plurality of first suction holes is smaller than the diameter of the belt holes, and
- the diameter of the plurality of second suction holes is larger than the diameter of the belt holes.

3. The conveying device according to claim 1, wherein the second suction region is less than half a length of the first suction region in the conveying direction.

4. The conveying device according to claim 1, wherein the first suction region is always positioned to face the entirety of the image forming unit along the conveying direction during the movement of the conveying surface in the conveying direction.

5. The conveying device according to claim 1, wherein the first and second suction regions are stationary during movement of the conveying surface in the conveying direction.

* * * * *